United States Patent [19]

Nakagawa

[11] Patent Number: 5,348,244
[45] Date of Patent: Sep. 20, 1994

[54] TAPE CASSETTE CASE HAVING RIDGES BEARING A SLIDING REEL LOCK MEMBER

[75] Inventor: Tomihiro Nakagawa, Kanagawa, Japan

[73] Assignee: Sony Corporation, Tokyo, Japan

[21] Appl. No.: 680,828

[22] Filed: Apr. 5, 1991

[30] Foreign Application Priority Data

Apr. 6, 1990 [JP] Japan ................................. 2-91503

[51] Int. Cl.[5] ................................................ G11B 23/087
[52] U.S. Cl. ................................. 242/338.3; 242/343
[58] Field of Search .................... 242/198, 197, 199; 360/132

[56] References Cited

U.S. PATENT DOCUMENTS

| | | | |
|---|---|---|---|
| 4,553,717 | 11/1985 | Takagi | 242/199 |
| 4,650,136 | 3/1987 | Tsuruta | 242/198 |
| 4,703,384 | 10/1987 | Kawada et al. | 242/198 |
| 4,742,415 | 4/1991 | Oishi | 360/132 |
| 4,743,992 | 5/1988 | Komiyama et al. | 360/132 |
| 5,041,938 | 8/1991 | Mizuno et al. | 360/132 |

FOREIGN PATENT DOCUMENTS 0111876 6/1984 European Pat. Off. .
0146311 6/1985 European Pat. Off. .

Primary Examiner—Daniel P. Stodola
Assistant Examiner—John Q. Nguyen
Attorney, Agent, or Firm—William S. Frommer; Alvin Sinderbrand

[57] ABSTRACT

A tape cassette has a plurality of spaced apart, elongated bearing surface portions elevated relative to an internal surface of a cassette case and on which a reel lock member is adapted to slide. Accordingly, the sliding movement of the reel lock member is prevented from being hindered by a burr generated at the periphery of a hole formed through the internal surface or by a burr-like projection generated at the periphery of an indentation formed by contact of an ejector pin with the internal surface upon molding of the cassette case. As a result, the locking and unlocking operations of the reel lock member with respect to a tape reel can be reliably effected.

1 Claim, 6 Drawing Sheets

TAPE CASSETTE CASE HAVING RIDGES BEARING A SLIDING REEL LOCK MEMBER

BACKGROUND OF THE INVENTION

The present invention relates to a novel tape cassette, and more particularly to a tape cassette including a cassette case, a tape reel rotatably accommodated in the cassette case, a recording medium tape wound around the tape reel, and a reel lock member slidably over an internal surface in the cassette case for locking the tape reel, wherein the internal surface (hereinafter "slide surface") of the cassette case with which the reel lock is in sliding contact is improved to ensure this smooth sliding of the reel lock member with respect to the cassette case, and locking and unlocking of the reel lock member with respect to the tape reel is reliably effected.

In a tape cassette for use with a VTR or the like, there is provided a reel lock mechanism for preventing slack of a tape when the tape cassette is in an unused condition.

FIGS. 7 and 8 show an example of such a reel lock mechanism a in a the conventional tape cassette in which Reference characters b designates a lower half of a cassette case, and reference characters e and c' designate lower flanges of a supply tape reel and a take-up tape reel around which a magnetic tape d is wound. The lower flanges c and c' are formed with a plurality of outer circumferential teeth e and e', respectively.

Reference character f designates a reel lock member comprised of a main portion g and two lock portions h and h' projecting from the main portion g. The reel lock member f is biased in a direction depicted by an arrow A by a spring or other biasing means (not shown).

The lock portions h and h' are formed of an elastic material, and they are normally engaged with the teeth e and e' of the lower flanges c and c' to thereby lock the tape reels against rotation in tape-loosening directions.

In other words, while the flanges c and c' are permitted to rotate in opposite directions indicated by arrows B and B', the flanges c and c' are restrained from rotating in the directions to create slack in the magnetic tape d by means of the lock portions h and h'.

In the reel lock mechanism of the tape cassette mentioned above, when the tape cassette is loaded into a cassette receiving portion of a recording and reproducing apparatus, the locked condition of the tape reels has to be released. Therefore, a slide surface of the lower half b, on which the reel lock member f is adapted to slide, is formed with a through-hole i for allowing insertion of a lock release pin j provided in the cassette receiving portion. Further, the main portion g of the reel lock member f is formed at its lower surface with an engagement hole k for receiving the lock release pin j inserted through the through-hole i of the lower half b. When the lock release pin j is engaged with the engagement hole k of the reel lock member f, the lock release pin j is moved in an unlocking direction, that is, in the direction depicted by an arrow C in FIG. 8, thereby moving the reel lock member f in the unlocking direction against a biasing force of the biasing means.

There is a possibility that a burr is generated at an opening edge of the through-hole i upon formation of the through-hole i through the slide surface of the lower half b. As a result, a bottom surface of the main portion g of the reel lock member f may be caught by such burr during the movement of the reel lock member f. Thus, smooth sliding movement of the reel lock member f is hindered. Particularly, the movement in the locking direction may be hindered to cause defective locking.

Further, the lower half b is formed with a complicated arrangement of many walls and projections in the area where the reel lock member f is disposed. Therefore, in molding the cassette case, an ejector pin is employed to abut against the slide surface of the lower half b, so as to separate the lower bali b from the mold. In this case, a burr-like projection is often generated at the peripheral edge of an area of contact of the ejector pin with the slide surface. Such burr-like projection also hinders the smooth sliding movement of the reel lock member f.

Although the burr generated at the opening edge of the through-hole i or the burr-like projection generated at the peripheral edge of the area of contact of the ejector pin with the slide surface may be removed by a finishing process carried out after molding of the cassette case smoothen the slide surface of the lower half b, this method is undesirable since such an finishing process causes a great increase in cost.

SUMMARY OF THE INVENTION

It is an object of the present invention to provide a novel tape cassette which can ensure smooth sliding of a Feel lock member with respect to a cassette case and reliably effect locking and unlocking of the reel lock member with respect to a tape reel.

According to an aspect of the present invention is formed with a plurality of spaced apart elongated bearing surface portions which are elevated relative to such surface, and an internal surface of the cassette case, the reel lock member is in sliding contact relationship therewith.

With this construction, the reel lock member can slide on the bearing surface portions irrespective of any obstacles formed on the slide surface of the cassette case, such as a burr generated at an inside opening edge of a hole formed through the slide surface or a burr-like projection generated at the peripheral edge of an area of contact of the ejector pin with the slide surface upon molding of the cassette case. Accordingly, the sliding movement of the reel lock member can be made very smooth, thereby reliably effecting the locking and unlocking operations of the reel lock member with respect to the tape reel.

The above, and other objects and features of the invention will be more fully understood from the following detailed description when read in connection with the accompanying drawings.

DETAILED DESCRIPTION OF THE PREFERRED EMBODIMENTS

Figure 1:
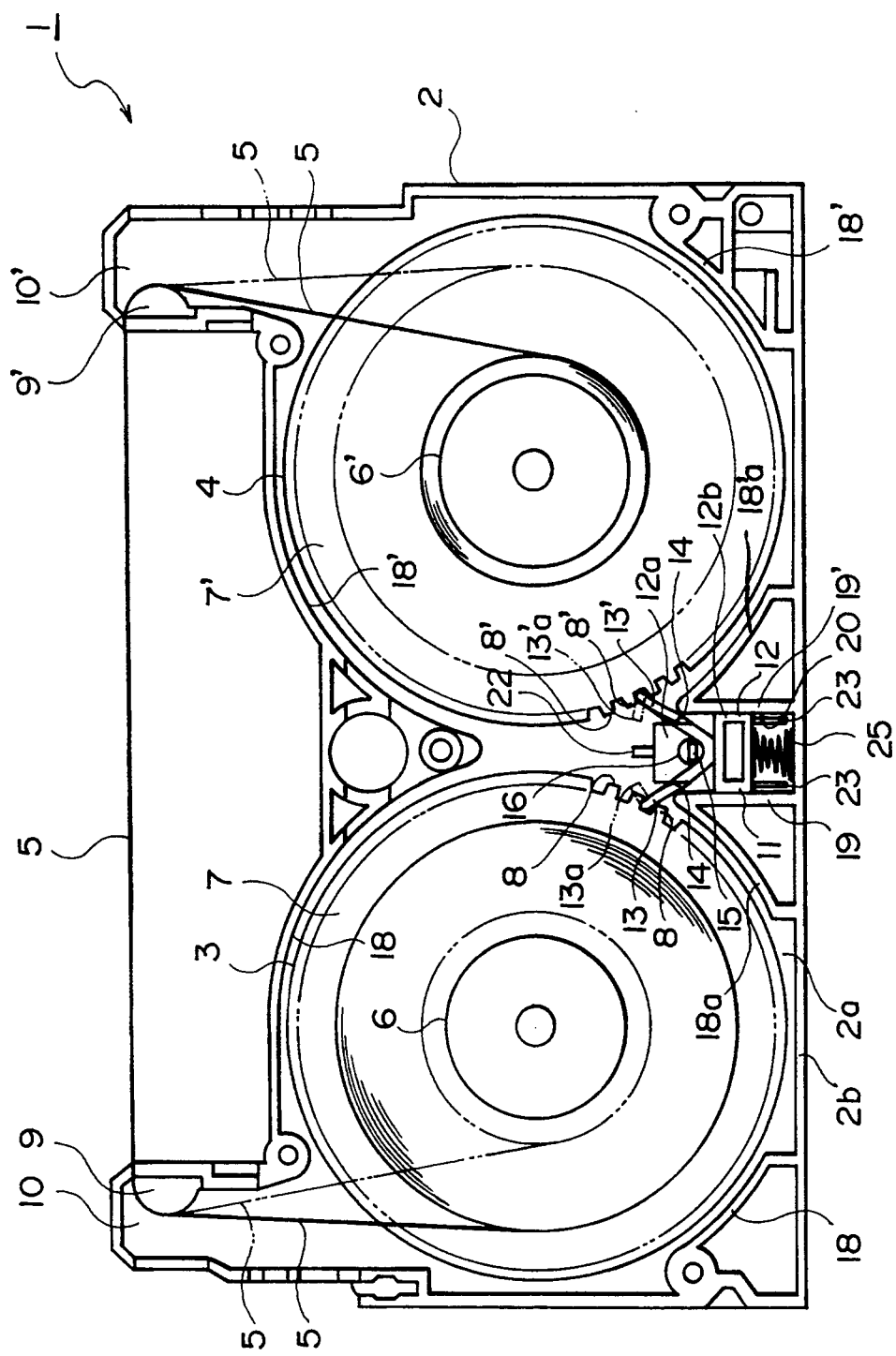
FIG. 1 is a schematic plan view of a tape cassette according to a preferred embodiment of the present invention, with an upper half of the tape cassette removed.

There will now be described a preferred embodiment of the present invention with reference to FIG. 1 of the drawings in which reference numeral 2 designates a cassette half (lower half) constituting a cassette case in cooperation with an upper half (not shown). A pair of tape reels 3 and 4 are rotatably accommodated in the cassette half 2. The tape reel 3 serves as a supply reel (which will be hereinafter referred to as the "S reel"), and the tap reel 4 serves as a take-up reel (which will be hereinafter referred to as the "T reel").

The tape reel 3 is constructed of a reel hub 6 around which a magnetic tape 5 is wound, and a pair of upper and lower reel flanges 7 (the lower flange 7 only being shown). Similarly, the tape reel 4 is constructed of a reel hub 6' around which the magnetic tape 5 is wound, and a pair of upper and lower flanges 7' (the lower flange 7' only being shown) The lower flanges 7 and 7' are formed with a plurality of outer circumferential teeth 8 and 8', respectively, arranged at regular intervals.

The magnetic tape 5 unwound from the S reel 3 is guided by a tape guide 9 to exit through an opening 10 of the tape cassette 1. Then, the magnetic tape 5 is introduced through another opening 10' into the tape cassette 1, and is guided by another tape guide 9', for winding on the T reel 4.

Referring to FIGS. 1 to 3 and FIGS. 6A and 6B, reference numeral 11 designates a reel lock member constructed of a main body portion 12 having a substantially rectangular block shape and from which two diverging lock portions 13 and 13' extend. The main portion 12 and the two lock portions 13 and 13' are formed integrally with each other.

The main body portion 12 is comprised of a front portion 12a and a rear portion 12b having a width slightly larger than that of the front portion 12a. The rear portion 12b is formed at its front end with two stepped portions 12c extending forwardly therefrom.

The lock portions 13 and 13' are formed as thin planar portions, and they are integrally connected at their rear ends, through thin-walled hinge portions 14 to front ends of the stepped portions 12c of the rear portion 12b. The lock portions 13 and 13' are integrally formed, at their front upper ends, with spring stopper portions 13a and 13'a projecting inwardly therefrom and shown in dot-dash lines on FIG. 2.

Reference numeral 15 designates a support pin projecting from an upper surface of the front portion 12a of the main body portion 12 at a substantially central position thereof.

Reference numeral 16 designates a torsion spring. A coil portion 16a of the torsion spring 16 is supported around the support pin 15 on the main body 12. An arm portion 16b of the torsion spring 16 is in elastic contact with an inside surface of the lack portion 13 at the underside of the spring stopper 13a. Similarly, another arm portion 16c of the torsion spring 16 is in elastic contact with an inside surface of the lack portion 13' at the underside of the spring stopper portion 13'a, The main body portion 12 is formed a downwardly opening engagement bore 17 the lower opening portion of the bore 17 is formed at its rear end with a rearwardly inclined surface 17a.

In FIGS. 1 to 6B, reference numerals 18 and 18' designate a plurality of ribs for defining spaces in which the tape reels 3 and 4 are accommodated, respectively. The ribs 18 and 18' are formed to project upwardly from a bottom plate 2a of the lower half 2 of the cassette case so as to be located on circles having diameters slightly larger than those of the lower flanges 7 and 7', respectively.

A pair of arcuate standing walls 18a and 18'a each having an arcuate inside surface are also formed to project upwardly from the bottom plate 2a of the lower half 2 at a mid-portion of a rear wall 2b of the lower half 2 (assuming that the direction in which the magnetic tape 5 is withdrawing from the cassette front direction of the tape cassette 1). The standing walls 18a and 18'a form a part of the ribs 18 and 18', respectively. Further, a pair of straight standing walls 19 and 19' are formed to project upwardly from the bottom plate 2a so as to extend in parallel in the front direction from the rear wall 2b of the tape cassette 1 to the arcuate standing walls 18a and 18'a respectively.

Therefore, a space 20 is defined by the parallel straight standing walls 19 and 19', the bottom plate 2a, and the rear wall 2b. The reel lock member 11 is received in the space 20 so as to be slidable in the front and rear directions of the tape cassette.

An upper surface of the bottom plate 2a in the space 20 is formed as a slide surface on which the reel lock member 11 is adapted to slide.

The bottom plate 2a in the space 20 is formed with a rectangular through-hole 21 elongated in the front and rear directions of the tape cassette 1. A stopper 22 projects upwardly from the bottom plate 2a at a position just before the through-hole 21. Accordingly, the reel lock member 11 is adapted to slide in the front and rear directions of the tape cassette 1 between a position where the front end surface of the main body portion 12 abuts against the stopper 22 and a position where the rear end surface of the main body portion 12 comes near the inner surface of the rear wall 2b.

Figure 4:
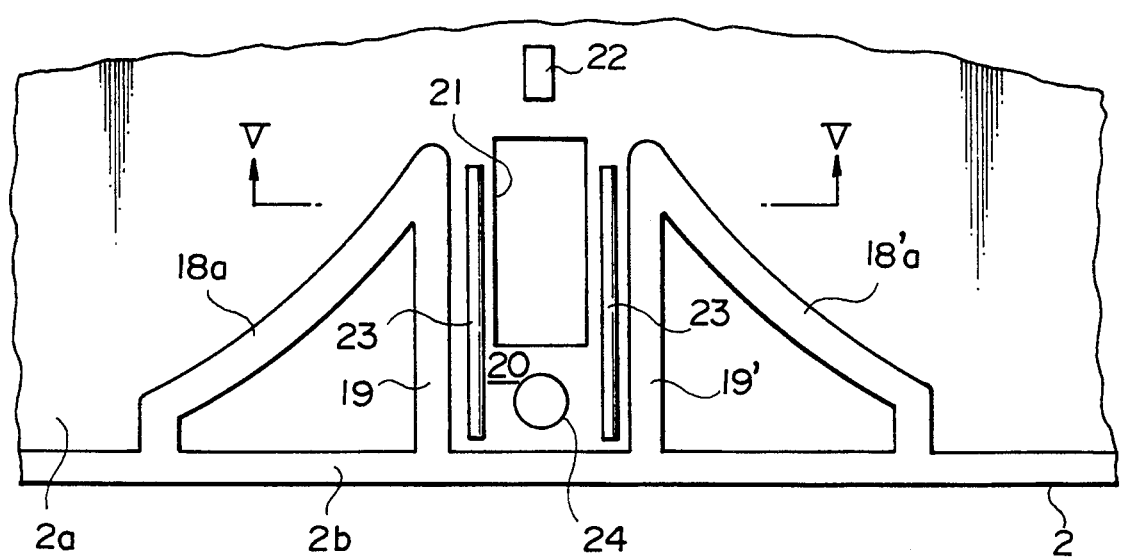
FIG. 4 is an enlarged fragmentary plan view of the the lower portion of a cassette case with a reel lock member removed.
Figure 5:
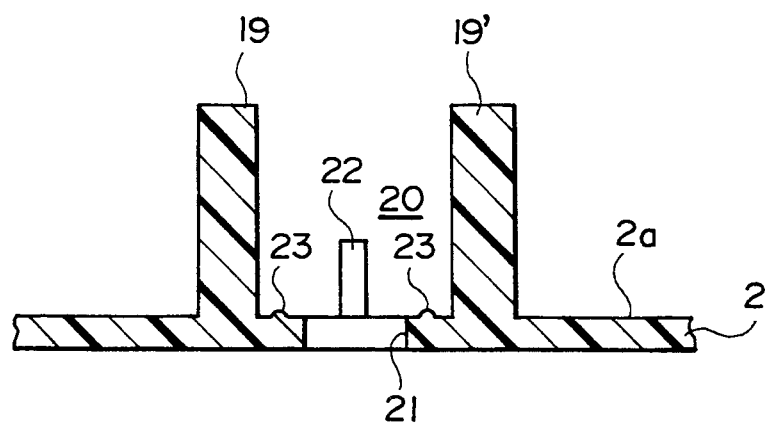
FIG. 5 is a cross section taken along the line V—V in FIG. 4.

In accordance with the present invention, and as shown particularly on FIG. 4, two ridges project from the upper surface of the bottom plate 2a between one elongated side edge of the through-hole 21 and the straight standing wall 19 and between the other elongated side edge of the through-hole 21 and the straight standing wall 19'. The two ridges 23 extend parallel to each other substantially the entire length of the space 20 in the front a rear direction of the tape cassette 1. The height of each ridge 23 from the upper surface of the bottom plate 2a is greater than the height of any burr that may be generated at the inside opening edge of the through-hole 21.

Reference numeral 24 designates an indentation that may be generated by the contact of an ejector pin (not shown) with the upper surface of the cassette half 2 from the bottom plate 2a upon separation of a mold. The height of each ridge 23 is also greater than the height of a burr-like projection that may be generated at the peripheral edge of the indentation 24.

The reel lock member 11 is disposed in the space 20 in such the manner that opposite side portions of a bottom surface of the main body portion 12 slidably contact two ridges 23. It will be apparent that the ridges 23 define spaced apart, elongated bearing surface portions elevated relative to the upper surface of the bottom plate 20 therebetween, and having the reel lock member 11 in sliding contact therewith. Thus, in moving the reel lock member 11 between the stopper 22 and rear wall 2b, the bottom surface of the main body portion 12 slides on the two ridges 23.

Reference numeral 25 designates a coil spring having large-diameter opposite end portions and a small-diameter central portion.

One end of the coil spring 25 is in elastic contact with the rear end surface of the main body portion 12 of the reel lock member 11, and the other end of the coil spring 25 is in elastic contact with the inner surface of the rear wall 2b.

Accordingly, the reel lock member 11 is normally forwardly biased by an elastic force of the coil spring 25 to a locked or engaged position where front ends 12b and 13'b of the lock portions 13 and 13' of the reel lock member 11 are engaged with the teeth 8 and 8' of the lower flanges 7 and 7! of the tape reels 3 and 4, respectively. The forward movement of the reel lock member 11 is limited by the stopper 22 projecting upwardly from the bottom plate 2a.

In operation, the slackening of the magnetic tape 5 is prevented by the reel lock member 11 in the following manner.

Figure 2:
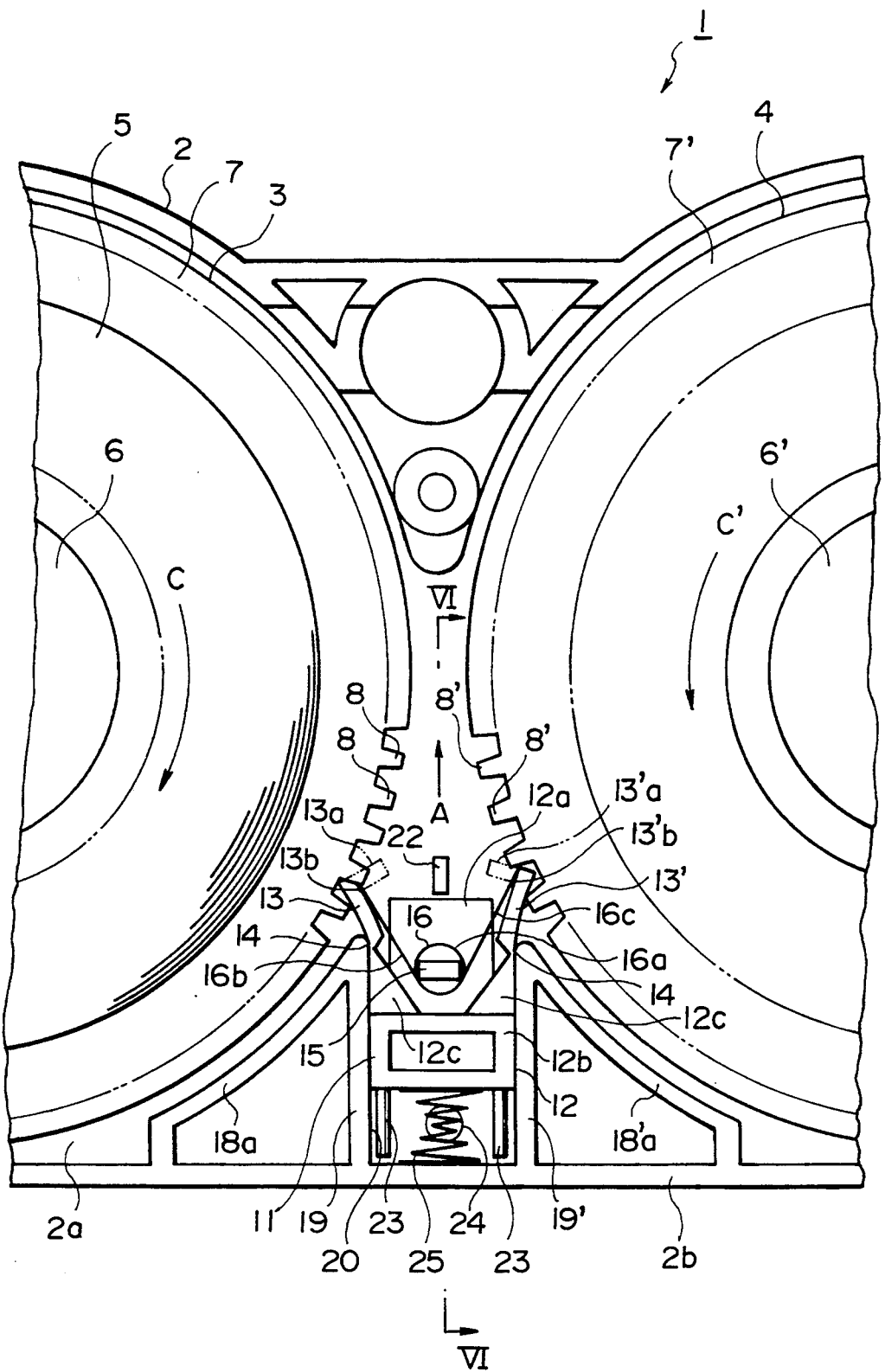
FIG. 2 is an enlarged fragmentary plan view of a reel lock mechanism included in the cassette shown in FIG. 1.
Figure 3:
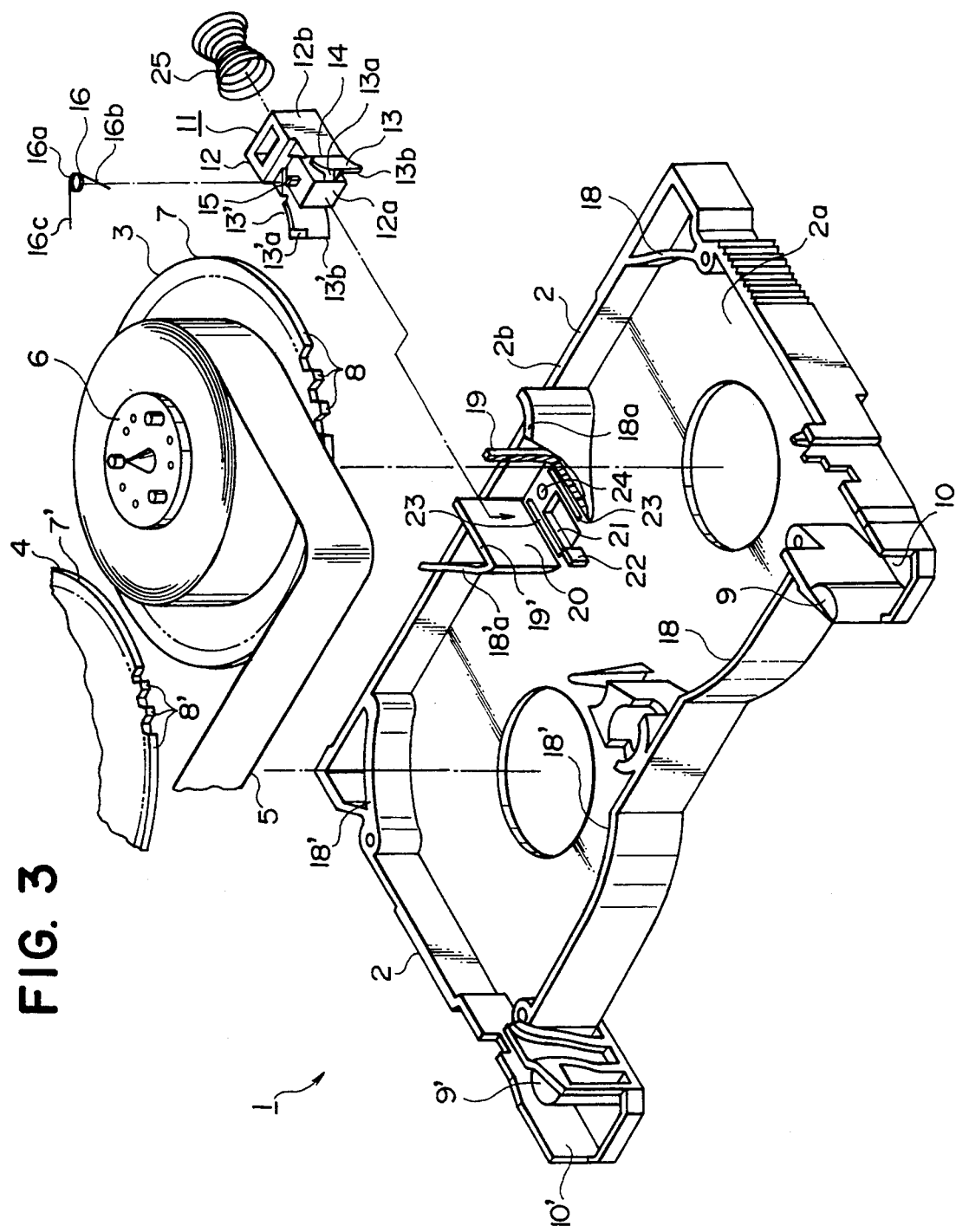
FIG. 3 is an exploded perspective view of the tape cassette.

When the tape cassette 1 is in an unused condition, the reel lock member 11 is biased by the elastic force of the coil spring 25 in the front direction as depicted by an arrow A in FIG. 2, and the front ends 13b and 13'b of the lock portions 13 and 13' are engaged with the teeth 8 and 8' of the tape reels 3 and 4, respectively. Accordingly, the rotation of the tape reels 3 and 4 in the directions for unwinding the magnetic tape 5 therefrom, as depicted by arrows C and C' in FIG. 2, is inhibited.

Figure 6A:
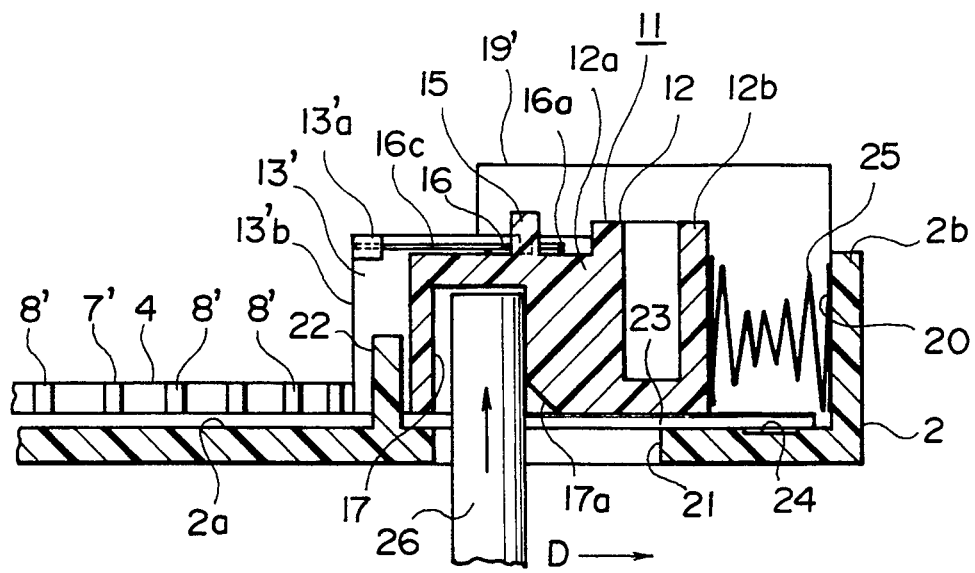
FIG. 6A is a cross section taken along the line VI—VI in FIG. 2, showing the reel lock member in its locked or engaged position.
Figure 6B:
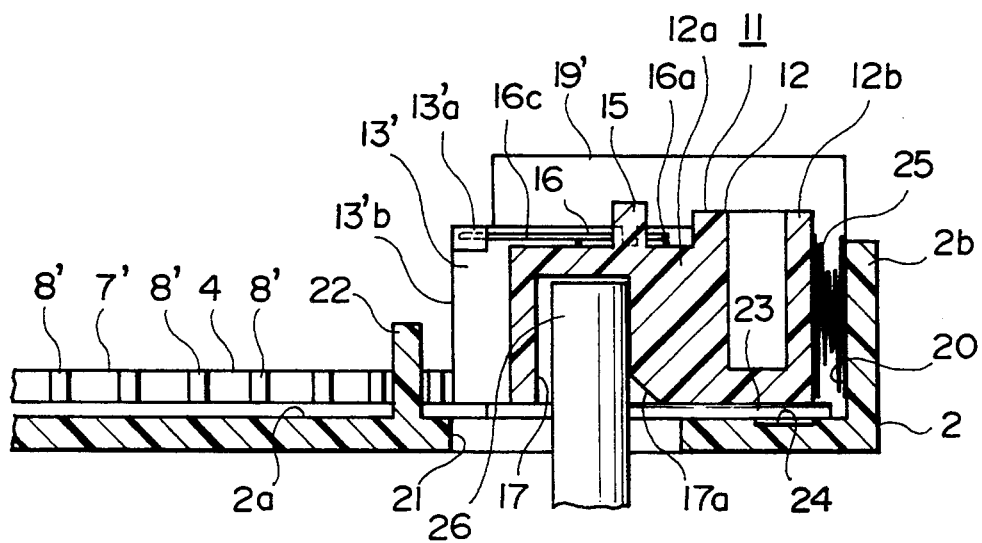
FIG. 6B is a view similar to FIG. 6A, showing a condition after unlocking the reel lock member.
Figure 7:
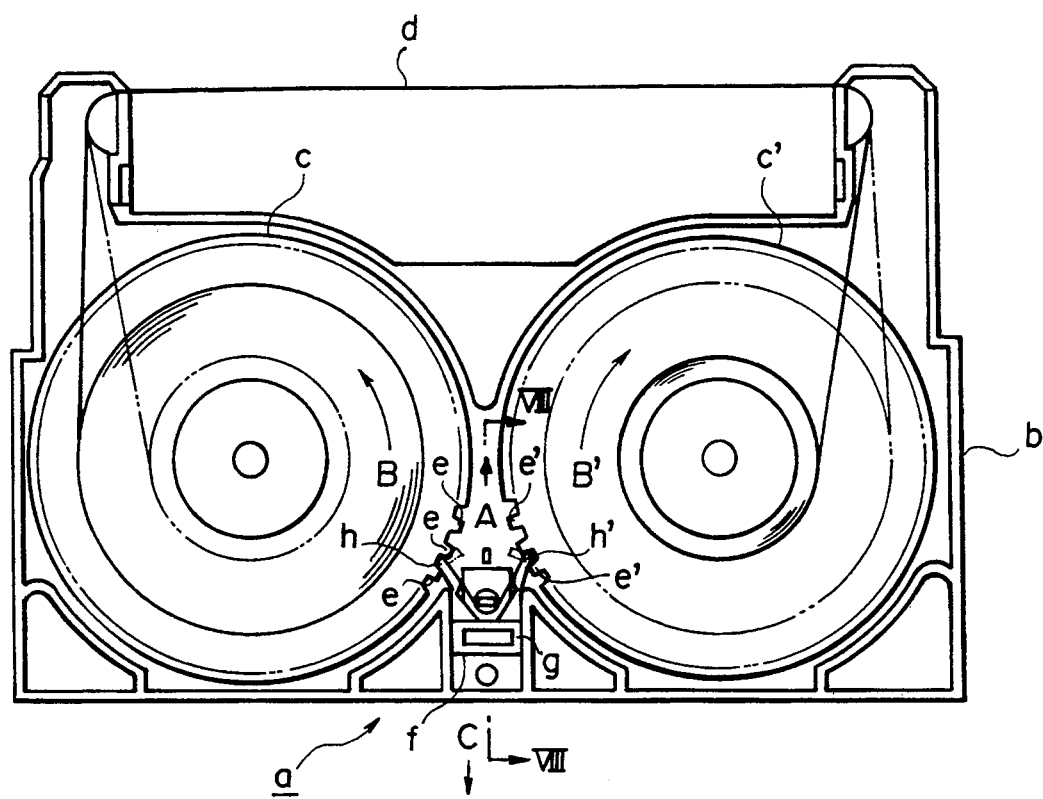
FIG. 7 is a schematic plan view of a tape cassette according to the prior art.
Figure 8:
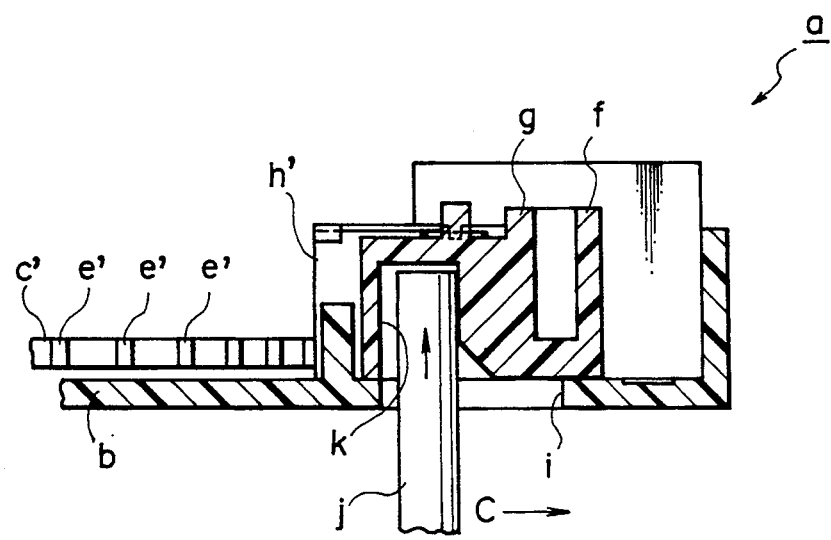
FIG. 8 is a cross section taken along the line VIII—VIII in FIG. 7.

When the tape cassette 1 is loaded into a recording and reproducing apparatus (not shown), a lock release pin 26 provided in the recording and reproducing apparatus is inserted through the through-hole 21 of the tape cassette 1 into the engagement bore 17 of the reel lock member 11, as shown in FIG. 6A. Then, the lock release pin 26 is moved in the direction as depicted by an arrow D in FIG. 6A to move the reel lock member 11 rearwardly against the biasing force of the coil spring to the position shown on FIG. 6B. As a result, the lock portions 13 and 13' of the reel lock member 11 are disengaged from the teeth 8 and 8' of the lower flanges 7 and 7'.

In such movement of the reel lock member 11, the bottom surface of the main body portion 12 slides smoothly on the two ridges 23 projecting from the upper surface of the bottom plate 2a of the tape cassette 1. Therefore, even if a burr is present at the inside opening edge of the through-hole 21, or a burr-like projection is present at the peripheral edge of the indentation 24 due to the contact of the ejector pin, the movement of the reel lock member 11 is not hindered or otherwise influenced at all by such burr or burr-like projection. Accordingly, the reel lock member 11 can be smoothly moved, and the locking and unlocking operations of the reel lock member 11 with respect to the tape reels 3 and 4 can be reliably effected.

Although two ridges extending in the front and rear direction of the tape cassette are employed in the above preferred embodiment as the bearing surface portions on which the reel lock member is adapted to slide, the bearing surface portions are not limited to the two ridges according to the present invention. For example, the bearing surface portions may be formed by embossing so as to indent the upper surface of the bottom plate 2a in an area between elongated areas intended for sliding contact with the reel lock member, provided that the indented area contains the through-hole 21 and the indentation 24 and the depth of the indented area is greater than the height of the burr, or the burr-like projection, etc. which would otherwise obstruct the movement of the reel lock member.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. In a tape cassette including a cassette case having an internal surface, a tape reel rotatably accommodated in said cassette case and having a toothed flange adjacent said internal surface, a recording tape wound around said tape reel, a slidable reel lock member having a main body with a bottom surface at which said main body is supported and a lock portion extending from a front end of said main body for locking engagement with said toothed flange of the tape reel, and spring means acting against a rear end of said main body for biasing the reel lock member in a direction for engagement of said lock portion with said toothed flange of the tape reel, said cassette case having a through-hole opening at said internal surface for allowing insertion into engagement with said reel lock member of a lock release pin provided in a recording and reproducing apparatus, and said internal surface having an indentation generated upon molding of said cassette case and being substantially aligned with said through-hole in a sliding direction of said reel lock member; the improvement comprising a plurality of spaced apart ridges projecting from said internal surface and extending parallel to said sliding direction of the reel lock member at opposite sides of said through-hole and indentation for defining respective elongated bearing surface portions elevated relative to said internal surface of said cassette case and having said bottom surface of said main body of the reel lock member supported by said bearing surface portions and in sliding contact relationship therewith at respective limited portions of said bottom surface.

* * * * *